(12) United States Patent
Raducan et al.

(10) Patent No.: US 10,452,910 B2
(45) Date of Patent: Oct. 22, 2019

(54) METHOD OF AVOIDING BIOMETRICALLY IDENTIFYING A SUBJECT WITHIN AN IMAGE

(71) Applicant: FotoNation Limited, Galway (IE)

(72) Inventors: Ilariu Raducan, Galway (IE); Ruxandra Vranceanu, Bucharest (RO); Razvan Condorovici, Bucharest (RO); Cosmin Stan, Bucharest (RO); Peter Corcoran, Claregalway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/301,937

(22) PCT Filed: Mar. 27, 2015

(86) PCT No.: PCT/EP2015/056815
§ 371 (c)(1),
(2) Date: Oct. 4, 2016

(87) PCT Pub. No.: WO2015/150292
PCT Pub. Date: Oct. 8, 2015

(65) Prior Publication Data
US 2017/0186138 A1    Jun. 29, 2017

Related U.S. Application Data

(60) Provisional application No. 61/975,262, filed on Apr. 4, 2014.

(51) Int. Cl.
*G06K 9/00*     (2006.01)
*G06F 16/50*    (2019.01)

(52) U.S. Cl.
CPC .......... *G06K 9/00597* (2013.01); *G06F 16/50* (2019.01); *G06K 9/0061* (2013.01); *G06K 2009/00953* (2013.01)

(58) Field of Classification Search
None
See application file for complete search history.

(56) References Cited

U.S. PATENT DOCUMENTS 6,836,554 B1 * 12/2004 Bolle ...................... G06F 21/32
340/5.53
2004/0019570 A1 * 1/2004 Bolle ...................... G06F 21/32
705/64

(Continued)

OTHER PUBLICATIONS

S. Thavalengal et al., "Iris pattern obfuscation in digital images," IEEE International Joint Conference on Biometrics, Clearwater, FL, 2014, pp. 1-8 (Year: 2014) (Year: 2014).*

(Continued)

*Primary Examiner* — Justin P. Misleh

(57) ABSTRACT

A method of image processing within an image acquisition device. In one embodiment an image including one or more face regions is acquired and one or more iris regions are identified within the one or more face regions. The one or more iris regions are analyzed to identify any iris region containing an iris pattern that poses a risk of biometrically identifying a subject within the image. Responsive to identifying any such iris region, a respective substitute iris region, containing an iris pattern distinct from the identified iris pattern to avoid identifying the subject within the image, is determined and the identified iris region is replaced with the substitute iris region in the original image.

11 Claims, 6 Drawing Sheets

(56) References Cited

U.S. PATENT DOCUMENTS

| | | | | |
|---|---|---|---|---|
| 2007/0274570 A1* | 11/2007 | Hamza | ............... | G06K 9/0061 |
| | | | | 382/117 |
| 2009/0141946 A1* | 6/2009 | Kondo | ................... | G06T 5/005 |
| | | | | 382/117 |
| 2010/0046805 A1* | 2/2010 | Connell | ............. | G06K 9/00597 |
| | | | | 382/115 |
| 2010/0046808 A1* | 2/2010 | Connell | ................. | G06F 21/32 |
| | | | | 382/117 |
| 2013/0259322 A1* | 10/2013 | Lin | ..................... | G06K 9/0061 |
| | | | | 382/117 |

OTHER PUBLICATIONS

Zhuoshi Wei et al, "Synthesis of large realistic iris databases using patch-based sampling", 19th International Conference on Pattern Recognition, 2008: ICPR 2008; Dec. 8-11, 2008, Tampa, Florida, USA, IEEE, Piscataway, NJ,Dec. 8, 2008 (Dec. 8, 2008), p. 1-4.

Daugman J, "Probing the Uniqueness and Randomness of IrisCodes: Results From 200 Billion Iris Pair Comparisons", Proceedings of the IEEE, IEEE. New York, US,vol. 94, No. 11, Nov. 1, 2006 (Nov. 1, 2006), p. 1927-1935.

Jinyu Zuo et al, "Global and local quality measures for NIR iris video", Computer Vision and Pattern Recognition Workshops, 2009. CVPR Workshops 2009. IEEE Computer Society Conference on, IEEE, Piscataway, NJ, USA,Jun. 20, 2009 (Jun. 20, 2009), p. 120-125.

* cited by examiner

METHOD OF AVOIDING BIOMETRICALLY IDENTIFYING A SUBJECT WITHIN AN IMAGE

CROSS-REFERENCE TO RELATED APPLICATIONS

The present application is National Stage of International Application No. PCT/EP2015/056815, filed Mar. 27, 2015 which claims priority to U.S. application No. 61/975,262 filed Apr. 4, 2014 and U.S. application Ser. No. 14/506,150 filed Oct. 3, 2014, now U.S. Pat. No. 9,239,957, issued Jan. 19, 2016.

FIELD OF THE INVENTION

The present invention provides an image processing method and apparatus for iris obfuscation.

BACKGROUND

The iris surrounds the dark, inner pupil region of an eye and extends concentrically to the white sclera of the eye.

A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric.

For the purposes of recognition, typically an image of an iris region is acquired in a dedicated imaging system that uses infra-red (IR) illumination with the eye aligned with the acquisition camera to bring out the main features of the underlying iris pattern.

An iris pattern is a gray-scale/luminance pattern evident within an iris region that can be processed to yield an iris code. The iris pattern can be defined in terms of polar co-ordinates and these are typically converted into rectangular coordinates prior to analysis to extract the underlying iris code.

An iris code is a binary sequence obtained after analysis of the iris pattern. A typical iris code contains 2048 bits. Note that some bits are effectively redundant, or 'fragile', as they are nearly always set to a '1' or a '0' as disclosed in K. Hollingsworth, K. W. Bowyer, and P. J. Flynn, "All Iris Code Bits are Not Created Equal," 2007 First IEEE Int. Conf. Biometrics Theory, Appl. Syst., 2007. Some of these fragile bits can be predicted in advance and as they offer less differentiation, they are often ignored when determining a match.

Nonetheless, systems supporting the acquisition of iris data from mobile persons are known, for example, as disclosed in J. R. Matey, O. Naroditsky, K. Hanna, R. Kolczynski, D. J. Lolacono, S. Mangru, M. Tinker, T. M. Zappia, and W. Y. Zhao, "Iris on the Move: Acquisition of Images for Iris Recognition in Less Constrained Environments," Proc. IEEE, vol. 94, 2006. This employs specialized lighting and requires people to walk along a specified path where multiple successive iris images are acquired under controlled lighting conditions. The system is proposed for airports where iris information is being used increasingly to verify passenger identity.

Separately, each of: C. Boyce, A. Ross, M. Monaco, L. Hornak, and X. L. X. Li, "Multispectral Iris Analysis: A Preliminary Study," 2006 Conf. Comput. Vis. Pattern Recognit. Work., 2006; M. Vilaseca, R. Mercadal, J. Pujol, M. Arjona, M. de Lasarte, R. Huertas, M. Melgosa, and F. H. Imai, "Characterization of the human iris spectral reflectance with a multispectral imaging system.," Appl. Opt., vol. 47, pp. 5622-5630, 2008; and Y. Gong, D. Zhang, P. Shi, and J. Yan, "Optimal wavelength band clustering for multispectral iris recognition," Applied Optics, vol. 51. p. 4275, 2012 suggest that iris patterns from lighter color eyes can be adequately acquired, but that eyes of darker color are difficult to analyze using visible light, H. Proença and L. A. Alexandre, "Iris segmentation methodology for non-cooperative recognition," IEE Proceedings—Vision, Image, and Signal Processing, vol. 153. p. 199, 2006; and A. E. Yahya and M. J. Nordin, "Non-cooperative iris recognition system: A review," Inf. Technol. (ITSim), 2010 Int. Symp., vol. 1, 2010 disclose non-cooperative iris acquisition, typically obtained at a distance of 3-10 meters using directed IR sources. As imaging subsystems on smartphones continue to improve in quality of acquisition and as image analysis and post-processing technique also continue to improve, a point at which the quality of images from conventional digital cameras and smartphones becomes of sufficient quality to analyze to a sufficient degree to determine some of the underlying features of an iris pattern will be reached.

For example U.S. Pat. No. 7,697,735 discloses identifying a person from face and iris data from a single 5 megapixel image. U.S. Pat. No. 7,697,735 provides recommended minimum sizes for face and eye features to enable a sufficiently accurate degree of recognition. However it does not specify any details of lighting or acquisition conditions and most iris acquisitions would not be of sufficient accuracy in an unconstrained use case. Nevertheless we note that the latest handheld devices can feature imaging subsystems with up to 40 megapixel resolutions and high power IR LEDs can be used to improve acquisition lighting conditions.

Other techniques such as high dynamic range (HDR) imaging combine more than one digital image to provide a combined image with improved image quality. This is a standard feature on most smartphone imaging systems and typically two images are acquired in sequence and combined, post-acquisition, to provide a sharper and higher quality final image. Techniques are well known in the literature to combine more than one image and as acquisition systems achieve higher frame rates (currently 60-120 frames per second for preview but likely to double with next-generation technology) it will be practical to capture as many as 8-10 images within the same time window used today to acquire two images. Taking advantage of sub-pixel registration or super-resolution techniques will therefore provide images with significantly higher local image contrast and sharpness than today's devices provide.

Thus it highly likely that images acquired with the next generation of imaging devices will be of sufficient quality to enable the determination of iris patterns from faces in standard images. This makes normal personal portraits and small-group photos a potential source for personal iris patterns with a high risk of such biometric information being used for a range of criminal activities ranging from identity theft, forging of personal identity documents up to gaining access to facilities protected by biometric security measures.

US 2009/0141946, Kondo discloses detecting an iris region of an eye from an original image and performing image conversion on the detected iris region so that feature data unique to the person cannot be extracted. For example, the iris region is divided into a plurality of portions and respective images of divided portions are re-arranged in a predetermined order or at random.

US 2010/0046805, Connell discloses generating a cancelable biometric including shifting at least one pixel region in a biometric image comprised of pixel regions. The pixel region is combined with at least one other pixel region to form a replacement region for the at least one pixel region to form a transformed image. The biometric image is reused to generate another transformed image if the transformed image is to be canceled.

SUMMARY OF THE INVENTION

Accordingly to a first aspect of the present invention there is provided an image processing method as claimed in claim 1.

In a second aspect there is provided an image processing method as claimed in claim 2.

In a third aspect there is provided an image processing method as claimed in claim 3.

Embodiments of the invention (i) identify candidate iris regions within digital images; (ii) segment and analyze such regions to determine if they provide an iris pattern of sufficient quality to pose a risk of theft of the associated biometric; (iii) determine and calculate a suitable substitute biometric of similar appearance and aesthetic quality, and (iv) on storage, transmission or otherwise making permanent the original image data the at-risk iris patterns are substituted in the original image.

Other aspects of the invention provide a computer program product comprising a computer readable medium on which instructions are stored which when executed on an image processing device perform the steps of claims 1 to 23.

Further aspects provide an image processing device according to claim 25.

BRIEF DESCRIPTION OF THE DRAWINGS

Various embodiments of the invention will now be described by way of example with reference to the accompanying drawings, in which.

DESCRIPTION OF THE PREFERRED EMBODIMENTS

Figures 1, 2:
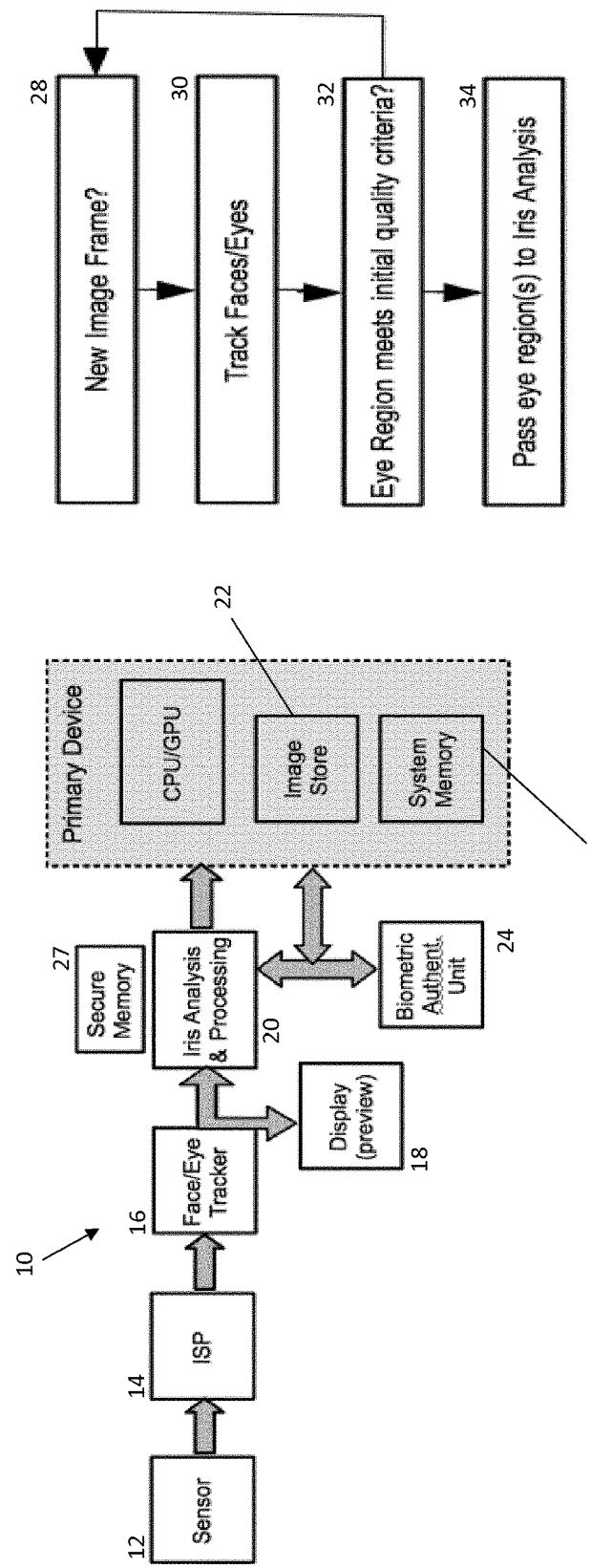
FIG. 1 shows an image processing system according to an embodiment of the present invention.
FIG. 2 is a flow diagram illustrating the preliminary processing of images according to an embodiment of the invention.

Referring now to FIG. 1, there is shown a digital imaging processing device 10 for performing image processing according to an embodiment of the present invention. The device may comprise for example, a camera, smartphone, tablet etc. including an image sensor 12 connected to an image signal processor/pipeline 14 which provides images for processing by the remainder of the system. The device may or may not include an IR light source. The images can include a stream of low or full resolution images used for preview or for generating video as well as full resolution still images selectively captured by the user.

Face detection in real-time has become a standard feature on most digital imaging devices, for example, as disclosed in WO2008/018887 (Reference: FN-143). Further, most cameras and smartphones also support the real-time detection of various facial features and can identify specific patterns such as 'eye-blink' and 'smile' so that for example, the timing of main image acquisition can be adjusted to ensure subjects within a scene are in-focus, not blinking or are smiling such as disclosed in WO2007/106117 (Reference: FN-149). Other approaches substitute in-focus, non-blinking or smiling portions of preview images into corresponding out-of-focus, blinking or non-smiling portions of main images to improve image quality for example as disclosed in WO2008/150285 (Reference: FN-172). Where such functionality is available in an image processing device, detecting and tracking face regions and eye regions within those face regions imposes no additional overhead and so this information is available continuously for an image stream.

In the present embodiment, a face/eye tracking subsystem 16 locates and tracks face regions within an image stream. However, it will be appreciated that a face/eye detection sub-system could simply be applied to single still images to detect any, face, and eye regions within the image.

In any case, the face/eye sub-system 16 acquires either a still image or an image from a stream, step 28, and then locates eye-regions within any detected face regions in the image, step 30, FIG. 2. The sub-system 16 performs some rudimentary calculations to provide an estimate of the quality of eye-regions based on face detection and any frame-to-frame tracking of the face region(s), step 32. In many images, any face(s) will be sufficiently distant so that any acquired eye region(s) will not be large enough to enable the extraction of a useful iris pattern. Eye regions in such images and can be safely ignored. Thus, the calculations at this stage can fall generally into the categories of: basic eye size, focus, local contrast/sharpness.

Preview images can be displayed in a display 18 and in some cases tracked face or eye regions can be indicated in the preview display.

The face/eye tracking subsystem 16 thus detects candidate eye regions and potential 'at risk' candidates can be flagged as the image or image stream is being processed. As indicated, the quality criteria used by the face/eye tracking subsystem 16 at step 32 can be quite rudimentary and additional, more detailed analysis can be made at the time when an acquisition is completed and an image (or image sequence) is (being) committed to storage 22 or transmitted beyond the device over a network connection (not shown).

Once a user initiates an action that will commit an image to permanent or semi-permanent storage 22, the sub-system 16 initiates the check to determine if the image (or image sequence) contains 'at risk' eye regions. If none are present then the image is saved normally. However if the image meets criteria for the above parameters, then 'at risk' regions are present and these eye regions may contain iris regions which may need to be substituted as described in more detail below. In this case, they are passed by the sub-system 16 to an iris analysis and processing sub-system 20 at step 34. FIG. 3(a) shows an example of this iris analysis performed by the sub-system 20 including passing an image through a biometric authentication unit (BAU) 24, whereas the example shown in FIG. 3(b) does not employ the BAU 24. Similar numerals are employed in each example to indicate equivalent steps.

Firstly, at step 36, the iris regions are extracted from 'at risk' eye regions and a more detailed analysis performed to confirm if a valid iris pattern is detectable. The iris region can be determined by edge analysis or Hough-transform. J. Daugman, "New methods in iris recognition," IEEE Trans. Syst. Man. Cybern. B. Cybern., vol. 37, pp. 1167-1175, 2007 discloses a range of additional refinements which can be utilized to determine the exact shape of iris and the eye-pupil. It is also common practice to transform the iris from a polar to rectangular co-ordinate system, although this is not necessary. The end result of this process is an iris region separated from the main image with a secondary inner-boundary corresponding to the iris/pupil boundary of the eye. This approximately doughnut-shaped region provides the input for the next stage of iris analysis.

Embodiments of the present invention can employ combinations of the following criteria to confirm if extracted iris regions are at risk of providing a pattern which enables recognition:

1. Usable Iris Size/Area: The extent of iris that is not occluded by eyelash, eyelids and reflections. Iris regions extending more than 120 horizontal pixels are regarded as guaranteeing a high accuracy of recognition and so are regarded as especially at risk. In embodiments of the invention, a threshold of between 50 and 100 horizontal pixels is chosen to signal an iris region may be at risk of recognition and so requires obfuscation.
2. Iris Shape: The measure of regularity of pupil-iris boundary—it should be noted that the iris region just around the pupil has high information content. In the embodiment, the iris-pupil boundary shape is matched with an ellipse—although in some embodiments, a circular test can be employed. An accurate fitting with an elliptical (or circular) approximation is taken as sufficient to indicate that an iris region is 'at risk' from the perspective of iris boundary shape quality. In other embodiments, active-snake contours or other conventional contour matching techniques may be employed to provide a measure of iris boundary shape. Preference is given to techniques that are optimized for embedded or hardware based embodiments.
3. Iris-pupil/Iris-sclera contrast: High contrast at these boundaries makes iris recognition more likely. It will be appreciated that contrast within an image is dependent on the acquisition conditions. In low-lighting, for example, only a narrow range of contrast can be achieved by most conventional imaging systems. An image obtained under good acquisition conditions will use the full contrast range of the imaging device, although across the entire image—the local contrast across the eye region, and more specifically across the iris itself may be restricted to quite a limited range sub-range of the overall contrast range. Local contrast enhancement can be used to greatly increase contrast within a specific region of an image. In its simplest form this involves a linear rescaling of local luminance values across the full range of values. More sophisticated techniques use a more adaptive approach, scaling values in one or more sub-ranges according to different weightings or even in a non-linear manner. In embodiments of the present invention, the local range of luminance variations within the eye and iris region are compared with those of the overall image. The size of the iris region is also considered because a greater and more accurate degree of contrast enhancement can be achieved if more image pixels are available. As a basic rule of thumb, a 150 pixel wide iris region can achieve a doubling of its underlying contrast range while still retaining sufficient spatial resolution; while a 300 pixel wide iris region can achieve a quadrupling, and so on. The potential increase in local contrast is clearly limited by the range of global image contrast and the presence of noise sources. For example, specular reflections and overexposed image regions indicate that the range of global contrast is already over-extended. Thus, in embodiments, the iris region is analyzed to determine how significantly the contrast range can be extended. If this suggests that a viable iris pattern could be extracted through advanced post-processing techniques, then it can be necessary to substitute for the current iris pattern.
4. Gaze Angle: is the deviation of optical axis of subject's iris from the optical axis of camera. Clearly, the more directly a subject looks into the imaging device at acquisition time increases the likelihood of producing a recognisable iris pattern.
5. Sharpness/defocus blur: again, the sharper and more in focus and unblurred an image and its eye regions, the more likely the image is to yield a recognisable iris pattern.

It should be noted that each of the above quality measures can be determined on a real-time basis within a current state-of-art digital imaging device. Other schemes for assessing iris quality are provided in:

E. Tabassi, P. Grother, and W. Salamon, "IREX II—Iris Quality Calibration and Evaluation (IQCE): Performance of Iris Image Quality Assessment Algorithms," 2011;

J. Z. J. Zuo and N. A. Schmid, "Global and local quality measures for NIR iris video," 2009 IEEE Comput. Soc. Conf. Comput. Vis. Pattern Recognit. Work, 2009;

D. S. Jeong, J. W. Hwang, B. J. Kang, K. R. Park, C. S. Won, D. K. Park, and J. Kim, "A new iris segmentation method for non-ideal iris images," Image Vis. Comput., vol. 28, pp. 254-260, 2010;

J. M. Colores, M. Garcia-Vazquez, A. Ramirez-Acosta, and H. Perez-Meana, "Iris Image Evaluation for Non-cooperative Biometric Iris Recognition System," in Advances In Soft Computing, Pt Ii, vol. 7095, 2011, pp. 499-509;

N. D. Kalka, J. Z. J. Zuo, N. A. Schmid, and B. Cukic, "Estimating and Fusing Quality Factors for Iris Biometric Images," IEEE Trans. Syst. Man, Cybern.—Part A Syst. Humans, vol. 40, 2010; and W. D. W. Dong, Z. S. Z. Sun, T. T. T. Tan, and Z. W. Z. Wei, "Quality-based dynamic threshold for iris matching," Image Process. (ICIP), 2009 16th IEEE Int. Conf., 2009.

If the designated criteria for an iris region are met, then an iris pattern is provided for the iris region; as well the color of the iris region.

In some embodiments the iris pattern may be evaluated and compared against a set of known patterns—e.g. the owner of the device and perhaps family members and friends. Certain actions may be pre-programmed according to the identified person, for example, the device may also signal the user of the device that 'at risk' iris patterns have been identified and are being substituted, step 38.

In the embodiment of FIG. 3(a), the digital imaging system/device 10 contains a biometric authentication unit (BAU) 24 that can perform iris code extraction from valid iris patterns. So, for example, the BAU may be employed by the device or other applications running on the device to authenticate a user and for example, to unlock the device or unlock a specific application running on the device.

At step 40, the BAU extracts the relevant iris code from the detected iris pattern and records this temporarily either in secure memory 27 or system memory 29. Where a BAU is available, this step are used as an additional test of the quality of detected 'at risk' iris regions. Thus, if an 'at risk' region is rejected by the BAU, step 42, then an error code from the BAU can verify that certain quality metrics are not met or that other aspects of the region prevent a useful biometric being extracted.

Nonetheless, it may be possible to correct the iris region, step 44, for example, with an alternative contrast enhancement such as outlined above, and to then re-submit the iris region for BAU analysis—this may involve again checking the enhanced iris against known patterns at step 38. This loop may be performed iteratively until all possible error corrections have been attempted.

Figure 3B:
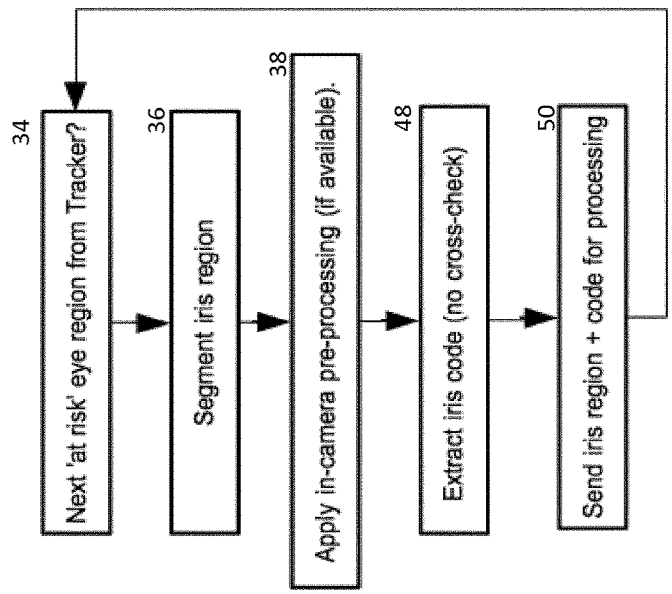
FIG. 3(b) is a flow diagram illustrating an iris analysis component of an image processing method without biometric authentication according to an alternative embodiment of the invention.
Figure 3A:
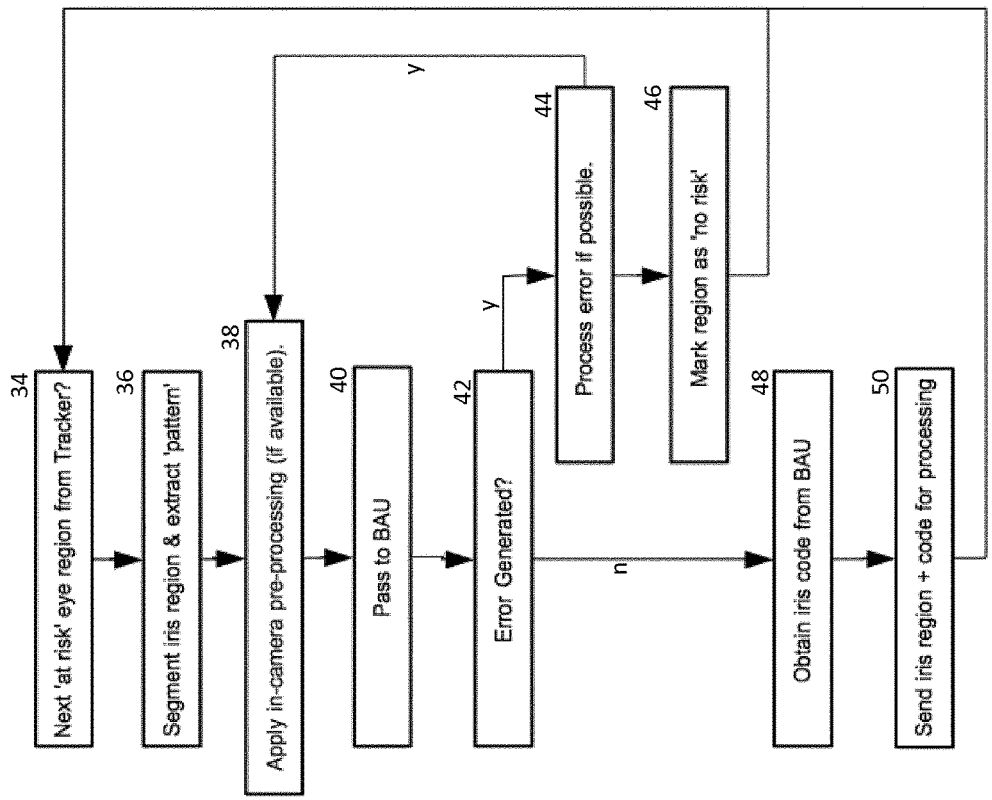
FIG. 3(a) is a flow diagram illustrating an iris analysis component of an image processing method using a biometric authentication unit (BAU) according to an embodiment of the invention.

If error correction is not possible or exhausted, step 46, the iris region is re-marked as not being at risk.

Where a BAU is not available, as in FIG. 3(b), embodiments operate in an unverified mode where it will not be possible to test the similarity between the original and a replacement iris pattern. However, in the embodiment of FIG. 3(a), this test is performed and provides the user with additional peace of mind.

In any case, if an iris code can be extracted from the iris region, either with or without a BAU, step 48, the iris is submitted for further processing, step 50 where a replacement iris pattern and ultimately a replacement iris region is provided.

Before continuing, it should be noted that a unique replacement iris need not be required for every image. In some embodiments, a new replacement iris is only provided when a new iris pattern is identified, for example in step 38. Thus where a device keeps a local information dataset for a group of persons that are regularly photographed or videoed by the user of the device, then each person can have a unique replacement iris pair, possibly stored in secure memory 27, which is used whenever they are identified in an image. Another set of replacement iris patterns can be used for unidentified persons. In such embodiments, a device only needs to occasionally obtain, or generate a set of replacement iris patterns. This may be implemented in-camera, but equally these may be obtained via a secure network service or a specialized app running on the device.

Embodiments of the invention attempt to generate or obtain a natural looking iris to substitute for the original iris detected in an acquired image as described in FIGS. 2 and 3. Preferably, an alternative iris is substituted for an original iris so as to retain a natural appearance, so as to avoid associating subjects in an image with their own biometrics.

Figure 4:
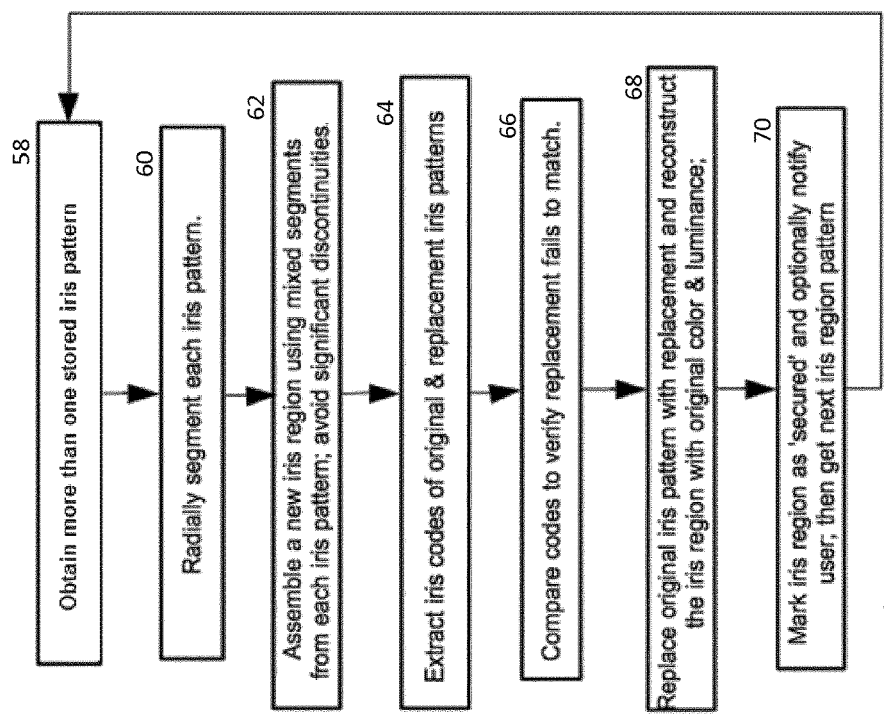
FIG. 4 illustrates an approach for generating replacement irises and for iris substitution according to an embodiment of the present invention.

Providing and substituting an iris may be achieved in a number of ways. Referring now to FIG. 4, in a first approach, for any given iris region within an image for which a replacement iris is required, steps 58-70 are performed. In step 58, a set of iris patterns are retrieved from a database of original iris patterns, preferably stored in secure memory 27. A replacement iris pattern is created through combining two or more of these patterns. The combining of patterns is achieved by first performing a radial segmentation of each stored iris pattern, step 60 and subsequently mixing/substituting segments from patterns that have a similar angle of segmentation to generate a single, combined iris pattern, step 62. In this embodiment the original color of each iris is also stored and the patterns used to generate a replacement pattern are taken from eyes with a different eye-color.

Referring now to FIGS. 6-9, an alternative to steps 58-62 described above is based on retrieving a single iris image from a library of standard iris images stored in secure memory 27 and blending the iris information for the standard image with the iris information for the identified iris region to provide a substitute iris region.

The standard iris images can be supplied with the iris analysis and processing software 20 and so can be common to all devices using the technique; or the library can be built up on the device itself either from images acquired by the device; or through the device acquiring images from a network source, such as the Internet.

For a given input eye region acquired from an image such as described above in relation to FIGS. 2 and 3, a standard iris image can be chosen from the library based, for example, on the colour similarity of the standard iris to the input eye region iris; or other criteria such as the correlation of the pupil areas within the input eye region and the standard iris images.

Figure 6B:
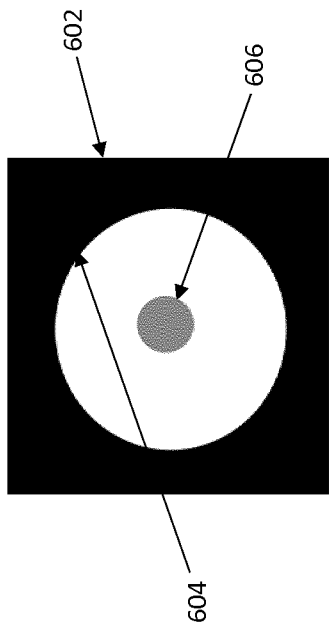
FIGS. 6(a) and 6(b) illustrate a standard iris and iris map for the standard iris.
Figure 6A:
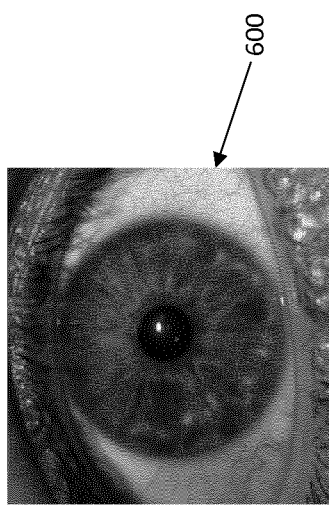

Ideally, each standard iris image comprises a complete iris and pupil, for example, as shown in the standard iris image 600 of FIG. 6(a), so that it can be used for processing the largest variety of input iris images. Referring to FIG. 6(b), associated with each standard iris in memory 27 is a map 602 indicating an outer boundary 604 of the iris as well as the pupil area 606 within the standard iris image 600. This map can be automatically generated as described in relation to step 36 above or the map can be semi-automatically generated with manual adjustment by a user—especially where the library is generated centrally and supplied with the iris analysis and processing software 20.

Figure 7B:
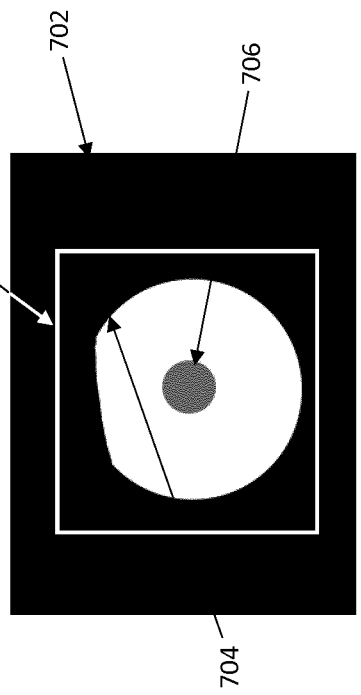
FIGS. 7(a) and 7(b) illustrate an input iris region and iris map for the input iris region.
Figure 7A:
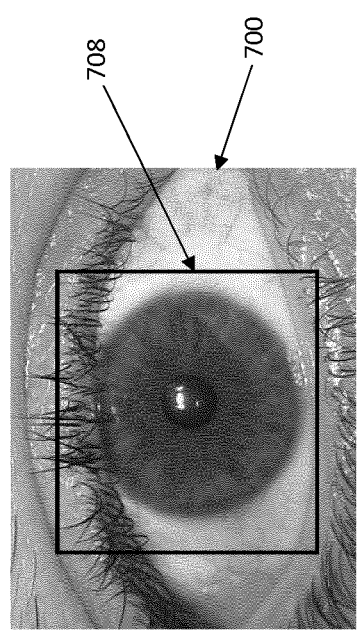

As before for FIGS. 2 and 3, an eye region 700 as shown in FIG. 7(a) is acquired and a map 702 as shown in FIG. 7(b) indicating the outer boundary 704 of the iris and the pupil area 706 is generated as described in relation to step 36. An iris crop 708 corresponding in proportion to the proportions of the map 602 for the standard iris is defined for the eye region 700. The standard iris image 600 and its map 602 can now be scaled to match the crop 708.

It will be appreciated that the outer boundary 704 of the input iris may not be circular where the iris is occluded by an eye lid and also the area of the input iris may not be the same as the area of the selected standard iris.

The present implementation is based on replacing the details of the input iris using the details from the standard iris.

These details are determined on a layer-by-layer basis, with for example k=4 layers, by successively blurring each of the input iris image and the standard image as follows:

In one example, the blurring is performed by box filtering with a k*k kernel where k=[1, 2, 4 and 8]% of the length of the crop 708. (It will be appreciated that if scaling were performed after blurring, then pre-blurred standard image information could be employed.)

Thus, for each of the standard iris and the input iris, the image IRIS is blurred to provide an image irisBlurred. Each irisBlurred image is then successively blurred for k=2 to 4 as follows:

irisBlurred_1=Filter(IRIS,k[1])

for i=2:4 irisBlurred_i=Filter(irisBlurred_(i−1), k[i])

Then, for each image IRIS and for each layer, detail layers are extracted by subtracting the blurred images from the previous image as follows:

$$\text{detail\_1} = \text{IRIS} - \text{irisBlurred\_1}$$

for i=2:4 detail_i=irisBlurred_(i−1)−irisBlurred_i

Figure 8B:
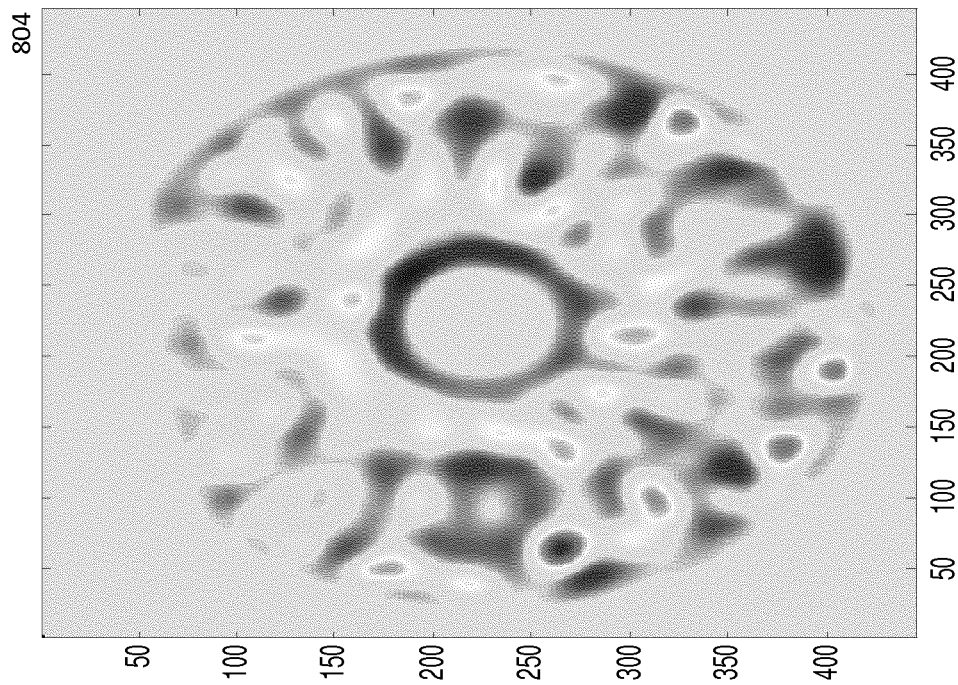
FIGS. 8(a) and 8(b) illustrate one layer of detail images for each of the input image of FIG. 7 and the standard image of FIG. 6 respectively.
Figure 8A:
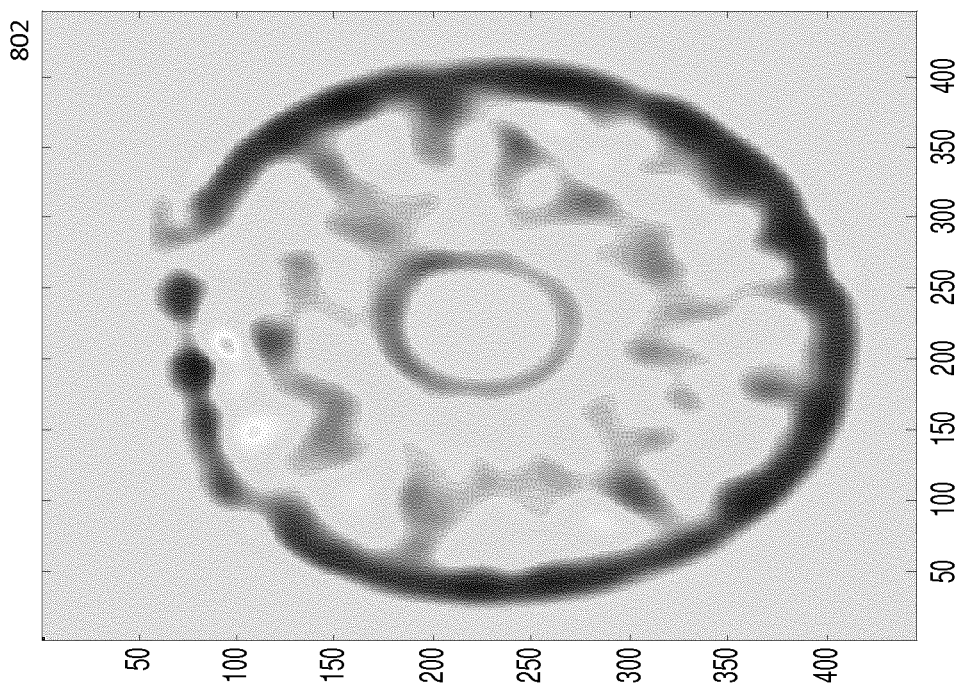

FIGS. 8(a) and 8(b) show the resultant detail images where k=4 for each of the input iris region crop, 802 and the standard iris 804 shown in FIGS. 6 and 7.

The non-iris areas outside the iris boundaries and the pupils, can be removed (blanked) from each of the 2×4 detail images using masks based on the maps 602 and 702. In some cases, the masks can be slightly blurred using, for example, an m*m kernel, wherein m=2% of crop length box filter to provide for better transitions in the final image.

Figure 9C:
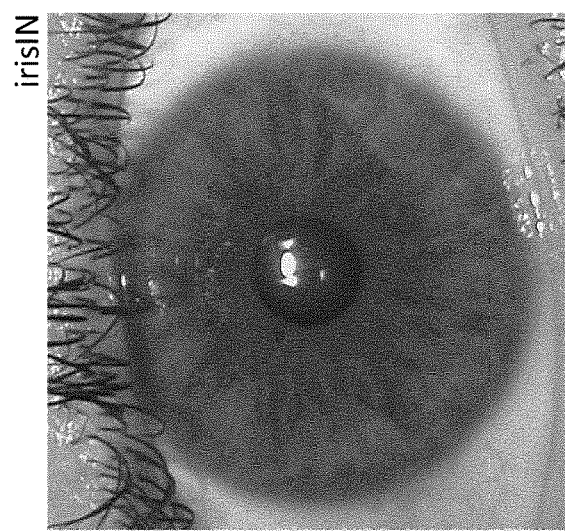
FIGS. 9(a) to 9(c) illustrate the removal and replacement of the details of an iris image.
Figure 9B:
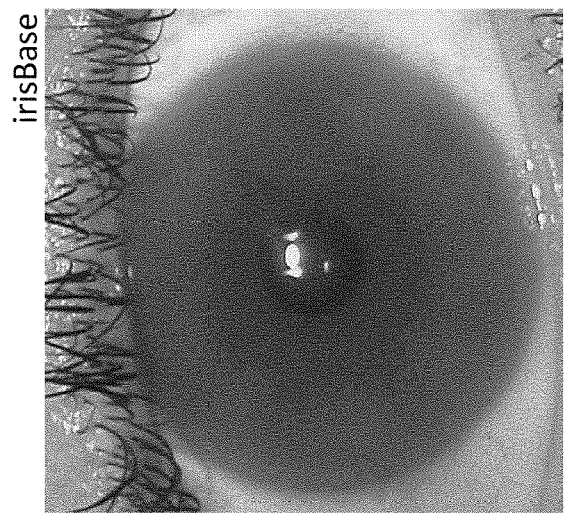
Figure 9A:
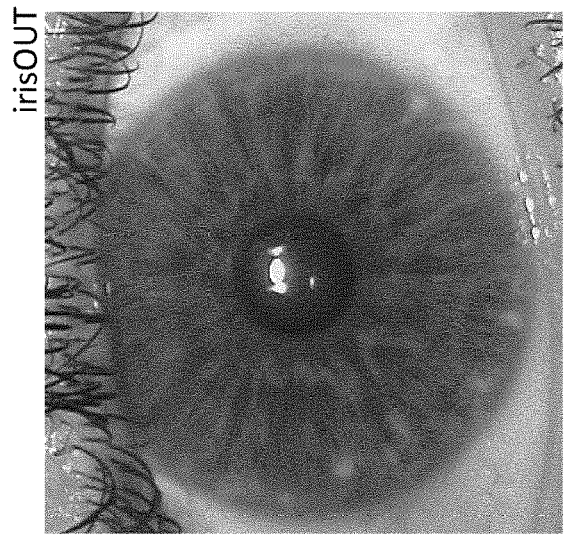

The iris details of the original iris image crop 708 in FIG. 7, indicated as irisIN in FIG. 9(a), are removed at each scale as follows:

$$\text{irisBase} = \text{irisIN} - \Sigma_{i=1}^{4} \text{detail\_i}$$

where detail_i are the iris portions of the detail images calculated from the input iris image, irisIN.

FIG. 9(b) shows the resultant irisBase image for the iris crop 708 of FIGS. 9(a) and 7(a).

Now the details removed from original image can be replaced with the details for the standard iris as follows:

$$\text{irisOUT} = \text{irisBase} + 0.75 * \Sigma_{i=1}^{4} \text{detail\_i}$$

where detail_i are the iris portions of the detail images calculated from the standard iris image.

It will be appreciated that where the iris boundaries and the pupil locations of the input eye region iris and the standard iris do not closely correlate, an affine transformation based on the maps 602 and 702 can be applied when adding the detail layers for the standard iris to the irisBase image to produce irisOUT.

FIG. 9(c) shows the resultant irisOUT image for irisIN, the iris crop 708 of FIG. 7(a). Note that in this case, because glint appears within the pupil, it is retained in the processed irisOUT image, whereas if a glint appears within the iris region of the original input image irisIN, this can be superimposed on the irisOUT image.

Referring back to FIG. 4, once a substitute iris has been determined, in steps 64 and 66, the iris code for a replacement iris pattern is extracted and compared with the code for the original iris pattern to verify these are sufficiently distinct. A standard metric for comparing patterns is Hamming Distance (HD). Ideally, for two iris images acquired from the same eye, the HD of the extracted codes would be zero and for two completely random iris images, HD would theoretically be 0.5 (equal number of matching and non-matching code bits). In practice because each iris code contains a significant number of fragile bits, an HD of approximately 0.33 to 0.35 can be used as a discriminating threshold value, as disclosed in J. Daugman, "Probing the Uniqueness and Randomness of Iris Codes: Results From 200 Billion Iris Pair Comparisons," Proc. IEEE, vol. 94, 2006. In some embodiments of the invention, the threshold for Hamming Distance could be user selected within the range 0.33 to 0.5 or it could be a function of a user's chosen security settings, so that a higher HD would be employed for more security conscious users If the codes are sufficiently distinct, the embodiment then continues by generating a replacement iris region based on the replacement iris pattern and re-constructing the iris region within the original image based on the replacement iris region, step 68. This step includes matching and blending the luminance, color and any specular reflections or eye glint from the original 'at risk' region so that the replacement eye region presents a substantially similar appearance. This will be described in more detail below, but as will be appreciated, once this step is complete, the image and/or iris region within the image can be marked as secure, step 70, and the method can proceed to process any further 'at risk' iris patterns identified within the image by returning to step 58.

Where a replacement iris pattern has previously been generated for an iris pattern recognized within an image, steps 58-66 can be skipped and the previously generated replacement iris pattern simply retrieved from memory before continuing with steps 68 and 70.

As mentioned above, conventional iris based BAU typically use a gray-scale iris pattern as a starting point. This practice originates from the use of IR illumination to enhance the iris pattern and the consequent single-channel image data obtained (gray-scale).

If an authentication system employs a color check in addition to a BAU, then an additional feature is that stored iris patterns used in in the approach of FIG. 4 are also afforded protection from reverse-engineering, as even if the iris pattern segments are identified and reverse-engineered it is not possible to know the original color of the eye that provided a particular pattern.

In such an embodiment the iris patterns of friends and family can be used to generate replacement patterns for each other.

In another alternative to the approach of FIG. 4, instead of steps 58-62, a replacement iris pattern is determined from the original iris pattern by patch-based sampling of the type described in U.S. Pat. No. 6,762,769, Guo et al, rather than segment swapping.

This technique has been employed for synthesizing irises, for example, as disclosed in Z. Wei, T. Tan, and Z. Sun, "Synthesis of large realistic iris databases using patch-based sampling," 2008 19*th Int. Conf Pattern Recognit.*, no. 1, pp. 1-4, Dec. 2008. Also, L. Liang, C. Liu, Y.-Q. Xu, B. Guo, and H.-Y. Shum, "Real-time texture synthesis by patch-based sampling," *ACM Transactions on Graphics*, vol. 20. pp. 127-150, 2001 discloses patch-based sampling to scramble a known iris pattern while retaining a realistic looking eye region.

In another alternative to the embodiment of FIG. 4, instead of interchanging segments of various stored iris patterns, stored iris patterns can be combined using patch based sampling techniques as described above, but combining patches from more than one iris pattern.

In another alternative, especially useful where a BAU is not available, again instead of steps 58-66, the iris code for the original iris is scrambled and used as a basis for reconstructing a replacement iris pattern. (Note that because an iris code is typically derived from a lossy transformation of the original iris pattern, there is a one-to-many relationship between an iris code and corresponding irises.) In this approach, the iris code of the 'at risk' region is determined. A range of bits of this code are then 'flipped'; typically of the order of 50% of bits are changed, but the exact number and relative locations of bits may be randomized. For example, bits known to be fragile might not be flipped as these are often masked by BAUs when comparing iris codes.

The remainder of this approach is based on the work described in S. Venugopalan and M. Savvides, "How to Generate Spoofed Irises from an Iris Code Template," IEEE Trans. Inf. Forensics Secur., vol. 6, pp. 385-395, 2011. Here, a unique discriminating pattern is next determined from the 'flipped' code (an anti-code for that of the original iris pattern) and a replacement iris pattern is generated on a neutral iris template. By flipping more than 50% of bits in the underlying iris code, a large Hamming Distance is ensured and thus cross-checking by a BAU is not required.

Another approach to constructing the replacement iris pattern of steps 58-62 is based on J. Galbally, A. Ross, M. Gomez-Barrero, J. Fierrez, and J. Ortega-Garcia, "Iris image reconstruction from binary templates: An efficient probabilistic approach based on genetic algorithms," *Comput. Vis. Image Underst.*, vol. 117, pp. 1512-1525, 2013. Due to the computational complexity of these techniques, the replacement iris may need to be determined outside the image capture device—e.g. as a secure network service.

In still further embodiments, instead of steps 58-62, a synthesized, artificial or random iris pattern is generated using techniques described in, for example, S. Shah and A. Ross, "Generating Synthetic Irises by Feature Agglomeration," 2006 *Int. Conf Image Process.*, 2006; L. Wecker, F. Samavati, and M. Gavrilova, "A multiresolution approach to iris synthesis," *Comput. Graph.*, vol. 34, pp. 468-478, 2010; or L. Cardoso, A. Barbosa, F. Silva, A. M. G. Pinheiro, and H. Proença, "Iris Biometrics: Synthesis of Degraded Ocular Images," vol. 8, no. 7, pp. 1115-1125, 2013; or other methods such as are reviewed in Venugopalan et al referred to above.

Figure 5:
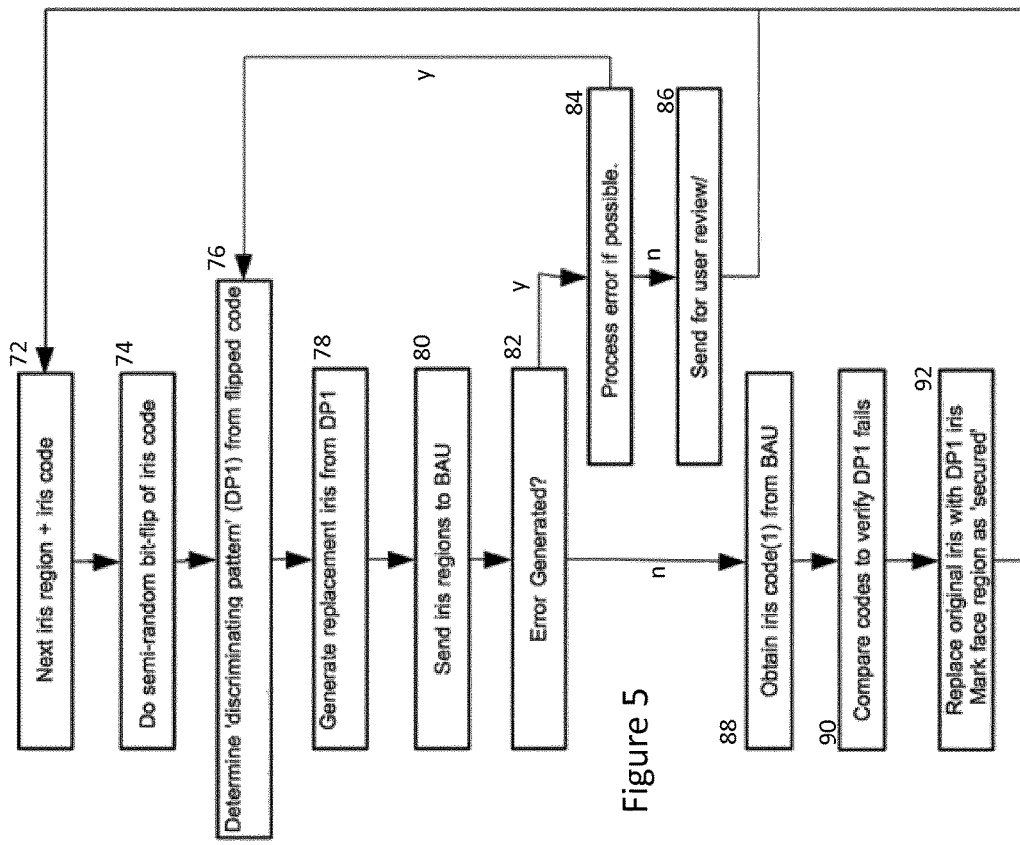
FIG. 5 illustrates an iris replacement approach employed in embodiments of the invention where a BAU is available.

Turning now to FIG. 5 which illustrates a still further approach to replacement iris generation and substitution, where a BAU is available.

Again, an iris region with a corresponding code which has not been recognized previously are provided, step 72. As in the alternative described above, a selected number of bits of the iris code are flipped, step 74. An iris pattern (DP1) is synthesized based on the flipped iris code, step 76, and an iris synthesized from the pattern DP1, step 76. The synthesized replacement iris is sent to a BAU, step 78 where it is analyzed, step 80.

If the BAU detects an error in the synthesized iris, an error is returned, step 82. There may be a possible fix, step 84, but if all fixes are exhausted and no suitable discriminating iris can be generated, the user is notified, step 86 and the process continues to step 72 and the next iris in the image for processing.

Otherwise, the BAU provides the iris code for the synthesized iris (this should correspond with the flipped code), step 88. The Hamming Distance between the respective synthesized and original iris codes can be determined, step 90. Again, in some embodiments of the invention, the threshold for Hamming Distance could be user selected within the range 0.33 to 0.5 or it could be a function of a user's chosen security settings, so that a higher HD would be employed for more security conscious users.

If the HD is suitably distinct, the process proceeds, step 92, by substituting the synthesized iris for the original iris as in step 70 of FIG. 4 and marking the image/iris accordingly.

In relation to the iris substitution performed in each of steps 70 and 92, it will be understand that a replacement and original iris may not be identical in size/shape and it can be necessary to blend the replacement iris into the original acquired image. In addition it is important to match the overall luminance and color of the original and replacement regions so that the replacement iris appears as natural as possible.

In one embodiment this substitution involves the following steps:

(i) The luminance distribution of the substitute iris region is brought to match that of the original target iris region. This is achieved by histogram matching.
(ii) The replacement region is scaled to the size of the target iris.
(iii) An alpha blending mask is created. This blending mask is completely opaque over the actual iris and transparent over the pupil, cornea and eyelids. In some embodiments the eye glint may also be incorporated into the blending mask.
(iv) The blending mask is blurred with a kernel that is sized adaptively. The purpose of this step is make the blended areas of the image gradually disappear into the surrounding regions.
(v) The luminance channel of the target image is blended with the replacement, based on the blending mask. For YCC or similar format images, the chroma (color) channels are untouched in order to preserve the original eye color.

Embodiments of the present invention are particularly suitable for images in a color space where there is separation between intensity/luminance and chrominance, e.g. YCC or LAB, where one image plane, in these cases, Y or L provides a greyscale luminance component. In such cases, it is the Y or L plane of the iris region of an image which is replaced with the Y or L plane information from another iris.

In some cases, some matching of the luminance histograms to keep the replacement iris region at the same brightness level can be performed.

The invention claimed is:

1. A method of image processing within an image acquisition device, the method comprising:
   storing one or more standard iris region images in storage;
   acquiring an original image of one or more subjects, the one or more subjects including one or more image face regions, the one or more image face regions comprising one or more image iris regions;
   analyzing the one or more image iris regions to identify an input iris region image, the input iris region image comprising an input iris pattern, the input iris pattern capable of being image processed and biometrically identifying one of the one or more subjects within said original image;
   responsive to identifying the input iris region image, determining, from among the one or more stored standard iris region images, a substitute iris region image, the determined substitute iris region image comprising a substitute iris pattern distinguishable from the input iris pattern, the substitute iris pattern inhibiting identification of said one of the one or more subjects within said original image, wherein said determining the substitute iris region image comprises:
   retrieving, from among the one or more standard iris region images stored in the storage, a first standard iris region image;
   performing a blurring operation on the first standard iris region image to generate a blurred first standard iris region image;
   performing first subsequent blurring operations on the blurred first standard iris region image to generate a plurality of blurred standard iris region images, each subsequent blurring operation of the first subsequent blurring operations increasing a blur of the first standard iris region image;
   subtracting each blurred standard iris region image of the plurality of blurred standard iris region images from another blurred standard iris region image of the plurality of blurred standard iris region images to generate a plurality of detail standard iris region images;

performing a blurring operation on the identified input iris region image to generate a blurred identified input iris region image;

performing second subsequent blurring operations on the blurred identified input iris region image to generate a plurality of blurred input iris region images, each subsequent blurring operation of the second subsequent blurring operations increasing a blur of the identified input iris region image;

subtracting each blurred input iris region image of the plurality of blurred input iris region images from another blurred input iris region image of the plurality of blurred input iris region images to generate a plurality of detail input iris region images;

subtracting each detail input iris region image of the plurality of detail input iris region images from the identified input iris region image to generate a difference input iris region image; and adding each detail standard iris region image of the plurality of detail standard iris region images to the difference input iris region image to generate the substitute iris region image.

2. The method of claim 1, wherein the adding further comprises identifying an area of eye glint in the identified input iris region image and incorporating said eye glint in the substitute iris region image.

3. The method of claim 1, further comprising transmitting or storing the substitute iris region image.

4. The method of claim 1, wherein the step of acquiring an original image of the one or more subjects comprises acquiring a frame within a sequence of image frames and identifying and tracking the one or more face regions within the sequence.

5. The method of claim 1, wherein the step of acquiring an original image of the one or more subjects comprises acquiring a still image.

6. The method of claim 1, wherein the step of analyzing the one or more image iris regions comprises identifying an eye region within one of said one or more image face regions and assessing one or more of: eye size, focus, local contrast, and local sharpness to determine iris pattern quality.

7. The method of claim 6, further comprising extracting iris regions from multiple eye regions, each extracted iris region comprising an iris pattern.

8. The method of claim 7, wherein the step of analyzing further comprises assessing any combination of: whether an extracted iris region of the extracted iris regions is of a predetermined size or area; whether an extracted iris region of the extracted iris regions is of a predetermined shape; and whether an extracted iris region of the extracted iris regions exhibits a predetermined level of contrast.

9. The method of claim 1, further comprising storing the substitute iris region image in the storage and wherein, responsive to identifying an iris region associated with a subject within said original image, said stored substitute iris region image is retrieved from the storage.

10. The method of claim 1, wherein the step of analyzing further comprises determining an iris code for the input iris pattern or an error code for adjusting the input iris pattern.

11. The method of claim 10, wherein said adjusting comprises adjusting a contrast of the input iris pattern.

* * * * *